(12) United States Patent
Woo

(10) Patent No.: US 7,581,282 B2
(45) Date of Patent: Sep. 1, 2009

(54) ROBOT CLEANER

(75) Inventor: Chun-Kyu Woo, Incheon (KR)

(73) Assignee: LG Electronics Inc., Seoul (KR)

( * ) Notice: Subject to any disclaimer, the term of this patent is extended or adjusted under 35 U.S.C. 154(b) by 645 days.

(21) Appl. No.: 11/104,540

(22) Filed: Apr. 13, 2005

(65) Prior Publication Data

US 2006/0053580 A1 Mar. 16, 2006

(30) Foreign Application Priority Data

Sep. 13, 2004 (KR) ...................... 10-2004-0073091

(51) Int. Cl.
*A47L 9/28* (2006.01)
*G05D 1/02* (2006.01)

(52) U.S. Cl. ........................ 15/319; 15/340.1; 700/245; 901/1; 901/46; 318/587

(58) Field of Classification Search .................. 15/319, 15/340.1, 340.3, 359, 362, 357, 358, 339; 318/568.1, 568.12, 568.18, 587; 901/1, 46, 901/49; 700/245, 247, 301, 248, 259
See application file for complete search history.

(56) References Cited

U.S. PATENT DOCUMENTS

| 4,934,018 | A | * | 6/1990 | Fortier et al. ............... 15/312.1 |
| 5,440,216 | A | | 8/1995 | Kim |
| 6,999,850 | B2 | * | 2/2006 | McDonald .................. 700/245 |
| 7,025,834 | B2 | * | 4/2006 | Joynt et al. .................. 134/21 |
| 7,272,868 | B2 | * | 9/2007 | Im et al. ...................... 15/319 |
| 2002/0016649 | A1 | | 2/2002 | Jones |
| 2003/0025472 | A1 | | 2/2003 | Jones et al. |
| 2004/0117064 | A1 | | 6/2004 | MacDonald |

FOREIGN PATENT DOCUMENTS

| CN | 1432334 | 7/2003 |
| CN | 2631410 | 8/2004 |
| GB | 2278937 | 12/1994 |
| JP | 7-079890 | 3/1995 |
| JP | 2004 139264 | 5/2004 |
| WO | 02 39868 | 5/2002 |
| WO | 02 062194 | 8/2002 |
| WO | 03 024292 | 3/2003 |

OTHER PUBLICATIONS

English language Abstract of JP 2004-139264.
English Language Abstract of JP 7-079890.
U.S. Appl. No. 10/837,660 to Hyoung Bin Im et al., filed May 4, 2004.
U.S. Appl. No. 10/837,666 to Hyeong-Shin Jeon, filed May 4, 2004.
English language Abstract of CN 1432334.

* cited by examiner

*Primary Examiner*—Gary K Graham
(74) *Attorney, Agent, or Firm*—KED & Associates, LLP

(57) ABSTRACT

A robot cleaner includes: a suction unit installed at a cleaner body, for sucking dirt on a floor; a driving unit for moving the cleaner body; a sensing unit mounted at the cleaner body, for sensing a depressed portion and a stepped portion such as a doorsill of a floor; and a control unit receiving a signal of the sensing unit, for controlling the driving unit to allow the cleaner body to avoid the depressed portion and the stepped portion, thereby correctly sensing the depressed portion or the stepped portion of the floor and avoiding such a portion. Accordingly, the cleaning operation is stably carried out.

14 Claims, 7 Drawing Sheets

ROBOT CLEANER

BACKGROUND OF THE INVENTION

1. Field of the Invention

The present invention relates to a robot cleaner, and particularly, to a robot cleaner capable of stably carrying out cleaning operation by sensing a depressed portion or a stepped portion such as a doorsill of a floor and thus by avoiding, passing, crossing over or going over such portions.

2. Description of the Background Art

A robot cleaner is a device that automatically moves in a cleaning area, carrying out cleaning operation, moves to a charging station when a charging voltage of a battery is decreased below a predetermined level, and returns to the cleaning area when the charging is completed to perform the cleaning operation.

The robot cleaner is provided with a suction unit for sucking foreign substances on a floor; a driving unit comprised of a driving motor and a driving wheel connected to the driving motor to move the robot cleaner; a navigation sensor for sensing a position and a cleaning area of the robot cleaner; and a control unit for automatically controlling the robot cleaner.

However, the conventional robot cleaner cannot continuously perform cleaning by falling to a depressed portion or being caught by a stepped portion such as a doorsill because it cannot sense the depressed portion making a relatively great height difference with a bottom of the robot cleaner or the stepped portion in the cleaning area.

SUMMARY OF THE INVENTION

Therefore, an object of the present invention is to provide a robot cleaner capable of stably carrying out cleaning operation by being provided with a sensing unit having a mechanical structure to correctly sense a depressed portion or a stepped portion such as a doorsill of a floor.

To achieve these and other advantages and in accordance with the purpose of the present invention, as embodied and broadly described herein, there is provided a robot cleaner comprising: a suction unit installed at a cleaner body, for sucking dirt on a floor; a driving unit for moving the cleaner body; a sensing unit mounted at the cleaner body, for sensing a depressed portion and a stepped portion such as a doorsill of a floor; and a control unit receiving a signal of the sensing unit, for controlling the driving unit to allow the cleaner body to avoid the depressed portion and the stepped portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
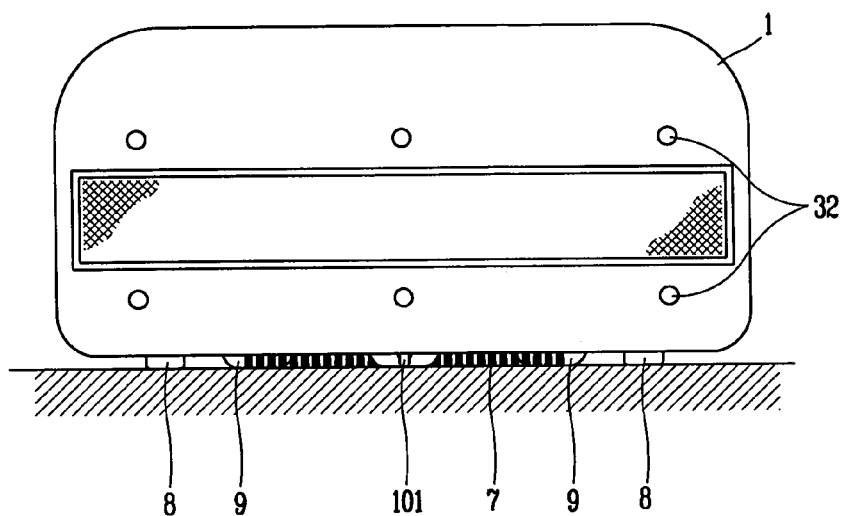
FIG. 1 is a front view showing a front side of a robot cleaner in accordance with the present invention.
Figure 2:
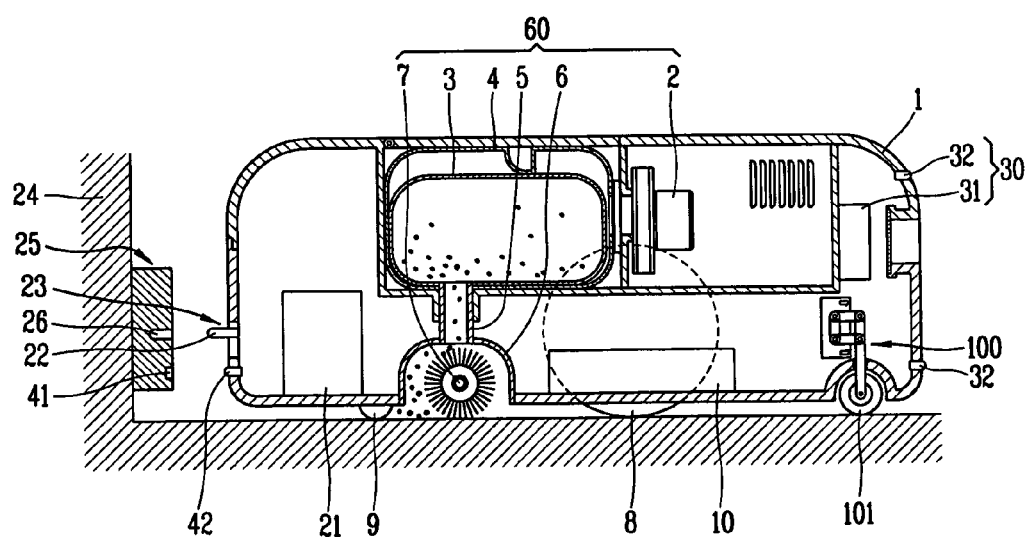
FIG. 2 is a side sectional view showing the robot cleaner in accordance with the present invention.
Figure 3:
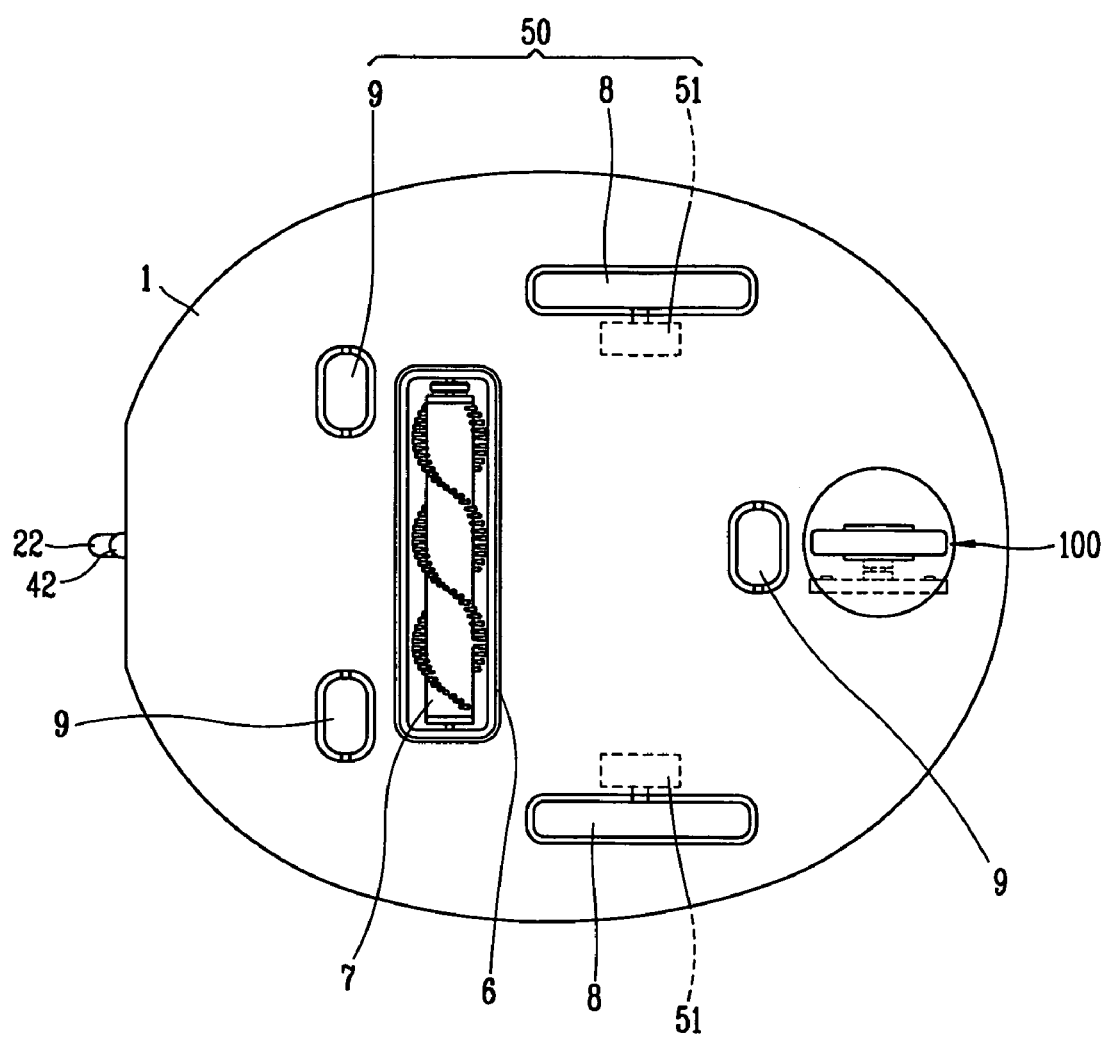
FIG. 3 is a bottom view showing a bottom of the robot cleaner in accordance with the present invention.

As shown in FIGS. 1 to 3, a robot cleaner in accordance with the present invention includes: a suction unit 60 installed at a cleaner body 1 for sucking dirt on a floor; a driving unit 50 for moving the cleaner body 1; at least one navigation sensor 30 installed at one side of the cleaner body 1, for determining a position of the cleaner body 1 and a position of an obstacle or the like when the cleaner body moves; a control unit 10 for controlling the suction unit 60 and the driving unit 50 according to a signal from the navigation sensor 30; and a sensing unit 100 mounted to the cleaner body 1 and having a mechanical structure to sense a depressed portion and a stepped portion of a floor.

In addition, a battery 21 is installed in the cleaner body 1, and a charging terminal part 23 having a charging terminal 22 connected to a connection terminal 26 of a power terminal part 25 installed on a wall of a room to thereby charge the battery 21 is provided at a rear side of the cleaner body 1. Also, a light emitting part 41 for emitting an optical signal for guiding the cleaner body 1 to the power terminal part 25 is installed at a lower side of the power terminal part 25, and a light receiving part 42 for receiving the optical signal emitted from the light emitting part 41 is installed at a lower side of the charging terminal part 23.

The suction unit 60 includes: a fan motor 2 installed inside the cleaner body 1, for generating a suction force; a filter container 4 installed at the rear of the fan motor 2, for receiving a filter 3 for filtering foreign substances such as dirt or the like sucked by the fan motor 2; a suction head 6 provided at a bottom of the cleaner body 1 and connected to the filter container 4 through a connection pipe 5, for sucking foreign substances on a floor; and a brush 7 rotatably disposed in the suction head 6, for brushing dirt on the floor.

The driving unit 50 includes: a driving wheel 8 rotatably installed at the cleaner body 1; a driving motor 51 for rotating the driving wheel 8; and at least one support wheel 9 installed at a bottom of the cleaner body 1, for supporting the cleaner body 1 on a floor, the support wheel 9 idled by a movement of the cleaner body 1.

The navigation sensor 30 includes: an ultrasonic wave transmission unit 31 installed at the front side of the cleaner body 1, for transmitting ultrasonic waves; and an ultrasonic wave reception unit 32 installed around the ultrasonic wave transmission unit 31 in plurality, for sensing ultrasonic waves reflected by obstacles or the like.

The sensing unit 100 is installed at a front side in a moving direction of the cleaner body 1 on the basis of the suction head 6 of the suction unit 60, and senses a depressed portion or a stepped portion like a doorsill of a floor while the cleaner body 1 travels.

Figure 4:
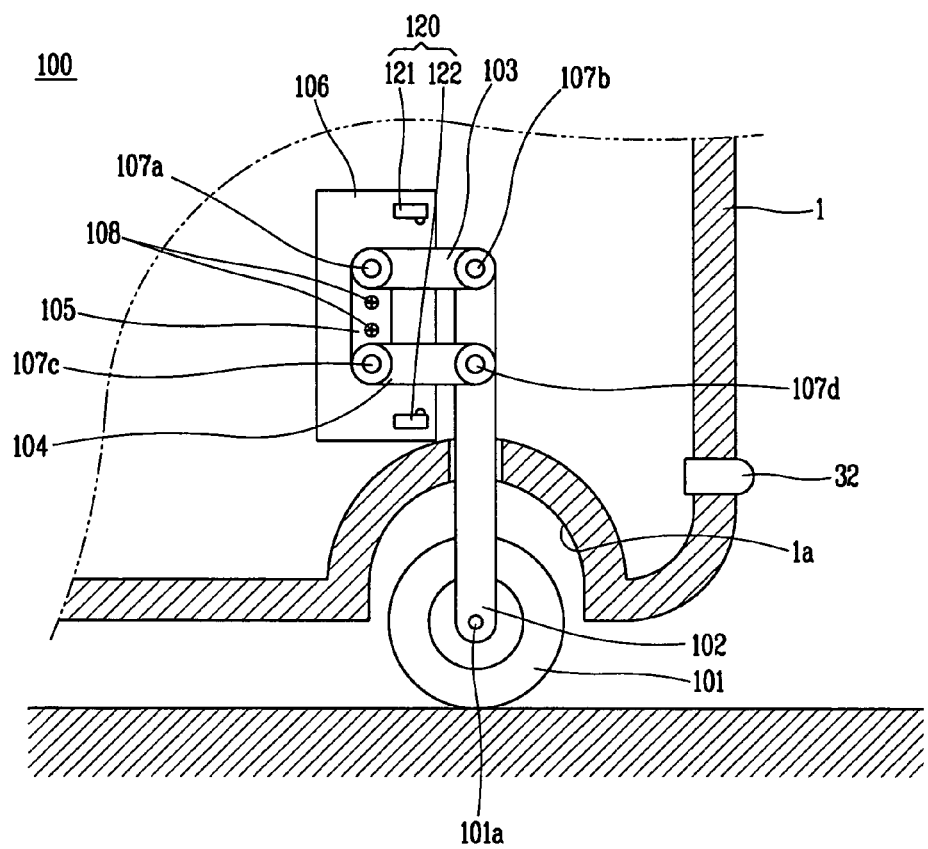
FIG. 4 is a partial sectional view showing a sensing unit for sensing a depressed portion and a stepped portion such as a doorsill in the robot cleaner in accordance with the present invention.

Namely, as shown in FIG. 4, the sensing unit 100 includes: a wheel 101 positioned with its one portion inserted in a recessed portion 1a recessed in the bottom of the cleaner body 1 at a predetermined depth, and displaced in a vertical direction according to prominence and depression of the floor while being idled by a movement of the cleaner body 1 in a state of contacting with a floor; a connection rod 102 hinge-connected to a rotary shaft 101a protruding from the rotation center of the wheel 101, and extended toward the inside of the cleaner body 1; a supporter 105 fixed to a bracket 106, which is fixed inside the cleaner body 1, through a coupling means such as a screw 108 or the like; a first link member 103 whose one end is hinge-connected to an upper end of the supporter 105 through a first pin 107a and whose other end is hinge-connected to an upper end of the connection rod 102 through a second pin 107b; a second link member 104 whose one end is hinge-connected to the supporter 105 through a third pin 107c at a predetermined distance from a position of the supporter 105 where the first link member 103 is connected and whose other end is hinge-connected to the connection rod 102 through a fourth pin 107b at a certain distance from a position of the connection rod 102 where the first link member 103 is connected, thereby maintaining a parallel relationship with the first link member 103; and a sensing unit 120 for measuring the amount of vertical displacement of the wheel 101.

The sensing unit 120 includes first and second contact switches 121 and 122 fixed to the bracket 106 and respectively coming in contact with the first and second link members 103 and 104 pivoted by a displacement in a vertical direction of the wheel 101.

Namely, as shown in FIGS. 5 to 8, the first contact switch 121 is installed above the first link member 103, and comes in contact with the first link member 103 pivoted on the first pin 107a when the wheel 101 and the connection rod 102 move upward. The second contact switch 122 is installed under the second link member 104, and comes in contact with the second link member 104 pivoted on the third pin 107c when the wheel 101 and the connection rod 102 move downward.

When the robot cleaner in accordance with the present invention constructed as above is operated by manipulation of a user, the control unit 10 and the navigation sensor 130 are operated, and the driving wheel 8 connected to the driving motor 51 is rotated, moving in a cleaning area according to a set pattern. And, as the fan motor 2 is driven, dirt on a floor is introduced to the filter 3 through the suction head 6 and the connection pipe 5, and is filtered. In such a manner, the cleaning operation is carried out.

Figure 5:
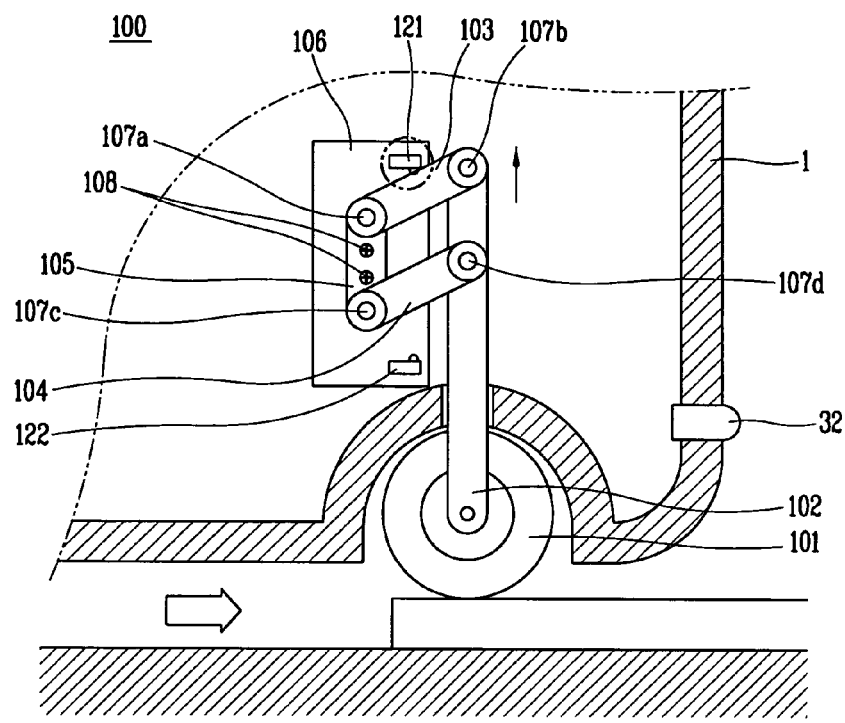
FIG. 5 is a partial sectional view showing that the sensing unit of FIG. 4 meets the stepped portion.

During such processes, as shown in FIG. 5, if the cleaner body 1 meets a stepped portion such as a doorsill, the wheel 101 ascends by the stepped portion, and the connection rod 102 ascends, too. Accordingly, the first and second link members 103 and 104 are respectively rotated about the first and third pins 107a and 107c counterclockwise on FIG. 5.

Figure 6:
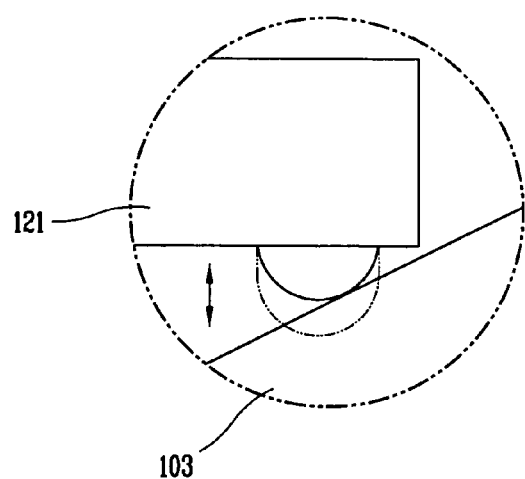
FIG. 6 is an enlarged view showing a first contact switch of FIG. 5.

Accordingly, as shown in FIG. 6, by the rotation of the first link member 103, a side surface of the first link member 103 comes in contact with the first contact switch 121, and the control unit 10 senses this contact and controls the driving motor 51, thereby allowing the cleaner body 1 to avoid the stepped portion.

Figure 7:
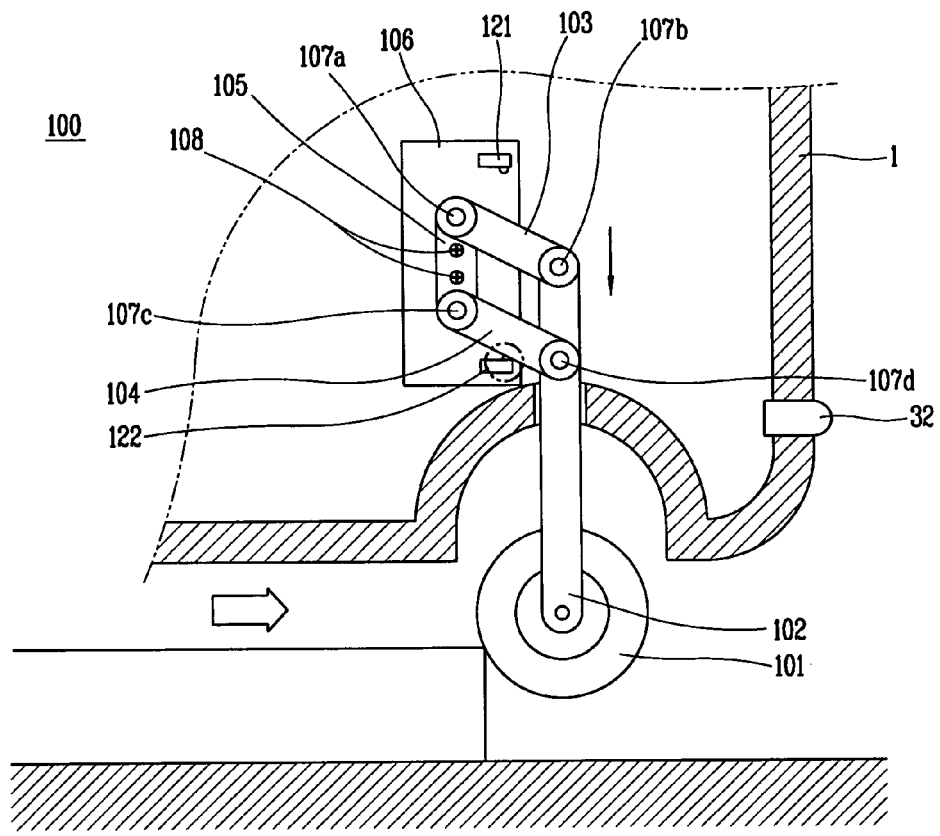
FIG. 7 is a partial sectional view showing that the sensing unit of FIG. 4 meets the depressed portion.

In addition, as shown in FIG. 7, if the cleaner body 1 meets a depressed portion, the wheel 101 descends because of its own weight, and the connection rod 102 descends, too. Accordingly, the first and second link members 103 and 104 are respectively rotated about the first and third pins 107 and 107c connected to the supporter 105 clockwise on FIG. 7.

Figure 8:
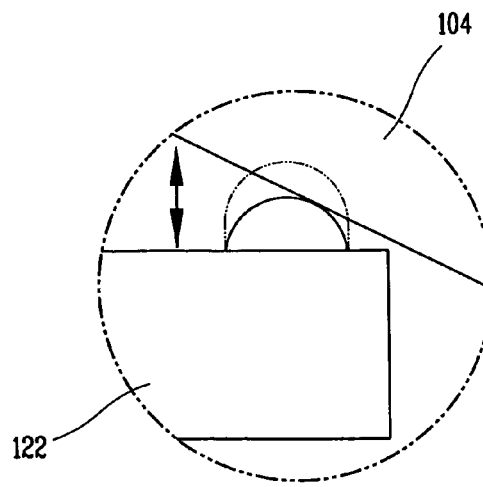
FIG. 8 is an enlarged view showing a second contact switch of FIG. 7.

Accordingly, as shown in FIG. 8, by the rotation of the second link member 104, a side surface of the second link member 104 comes in contact with the second contact switch 122, and the control unit 10 senses this contact and controls the driving motor 51, thereby allowing the cleaner body 1 to avoid the depressed portion.

Figure 9:
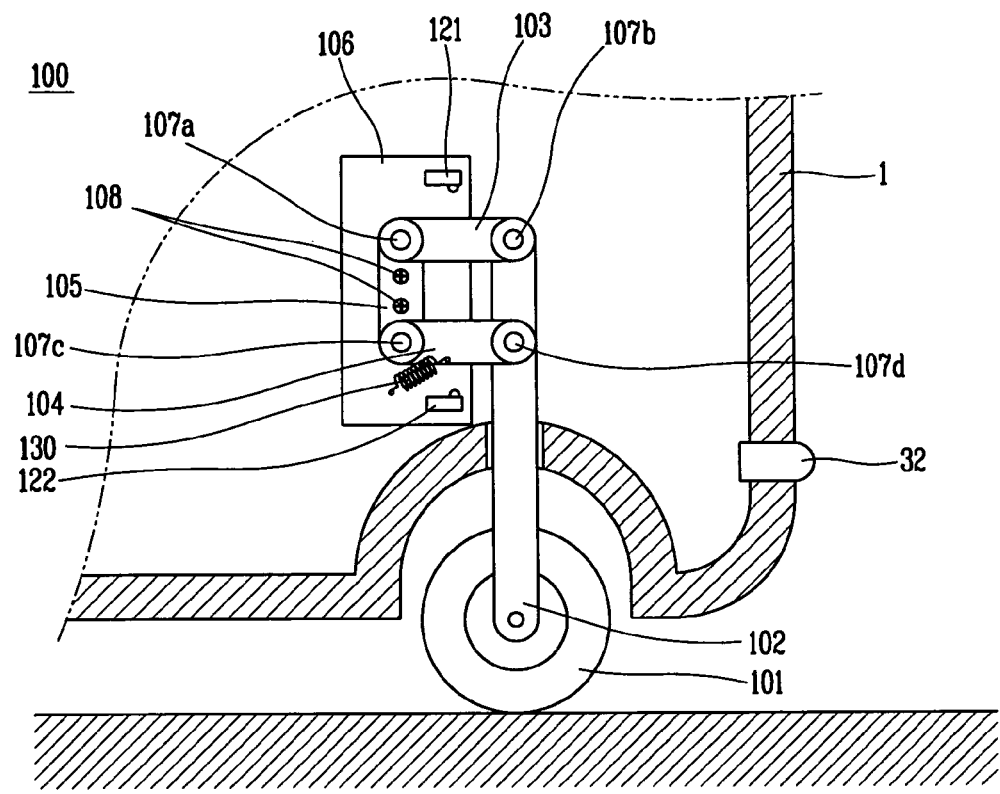
FIG. 9 is a partial sectional view showing another example of a sensing unit of a robot cleaner in accordance with the present invention.

FIG. 9 shows another example of a sensing unit for sensing a depressed portion and a stepped portion such as a doorsill in a robot cleaner in accordance with the present invention.

As shown in FIG. 9, the sensing unit 100 is provided with an elastic member 130 whose one end is fixed to the bracket 106 of the cleaner body 1 and whose other end is fixed to the first or second link member 103 or 104, so that the wheel 101, the connection rod 102, and the first and second link members 103 and 104 move smoothly.

The elastic member 130 provides a preset elastic force to the first and second link members 103 and 104, the connection rod 102 and the wheel 101. By the elastic force of the elastic member 130, a force for rotating the first and second link members 130 and 140 about the first and second pins 107 and 107c clockwise on FIG. 9 works on the first and second link members 130 and 104.

Accordingly, because a downward force works on the wheel 101 by the elastic force of the elastic member 130, the wheel 101 can correctly react to a floor condition. In addition, undesired shaking of the wheel 101, the connection rod 102 and the first and second link members 103 and 104, which may be generated when the wheel 101 meets the depressed portion or the stepped portion such as a doorsill, can be prevented.

And, when the cleaner body 1 meets the depressed portion, the wheel 101 descends by not only its weight but also an elastic force of the elastic member 130. Therefore, the wheel 101, the connection rod 102 and the first and second link members 103 and 104 speedily move, so that the operation for sensing the depressed portion of the floor is quickly made.

Here, the elastic member 130 is not limited by connection with the first or the second link member 103 or 104, but may be connected to the connection rod 102 or the wheel 101, thereby applying a downward force to the wheel 101.

Figure 10:
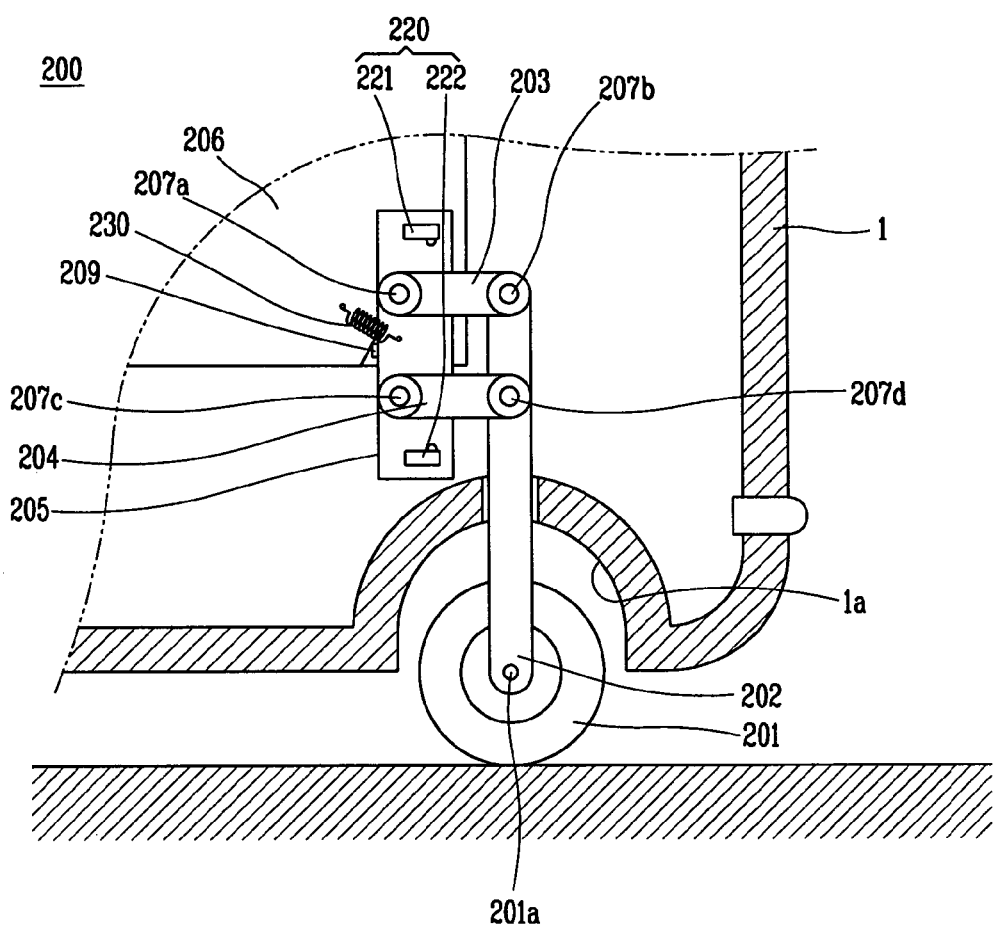
FIG. 10 is a partial sectional view showing still another example of a sensing unit of a robot cleaner in accordance with the present invention.

FIG. 10 shows still another example of a sensing unit for sensing the depressed portion and the stepped portion such as a doorsill in a robot cleaner in accordance with the present invention.

As shown, a sensing unit 200 installed at a cleaner body 1 for sensing the depressed portion and the stepped portion includes: a wheel 201 positioned with its one portion inserted in a recessed portion 1a recessed in a bottom of a front side of the cleaner body 1 at a predetermined depth, idled by a movement of the cleaner body 1 in a state of contacting with a floor, and displaced in a vertical direction according to the prominence and depression of the floor; a connection rod 202 hinge-connected to a rotary shaft 201a protruding from the rotation center of the wheel 201 and extended toward the inside of the cleaner body 1; a supporter 205 pivotally connected to a bracket 206, which is fixed inside the cleaner body 1, through a first pin 207a; a first link member 203 whose one end is hinge-connected to an upper end of the supporter 205 through the first pin 207a and whose other end is hinge-connected to an upper end of the connection rod 202 through a second pin 207b; a second link member 204 whose one end is hinge-connected to the supporter 205 through a third pin 107c at a predetermined distance from a position of the supporter 205 where the first link member 203 is connected and whose other end is hinge-connected to the connection rod 202 through a fourth pin 207d at a predetermined distance from a position of the connection rod 202 where the first link member 203 is connected, thereby maintaining a parallel relationship with the first link member 203; a sensing unit 220 for measuring the amount of vertical displacement of the wheel 201; an elastic member 230 installed between the bracket 206 and the supporter 205 for providing an elastic force to the supporter 205; and a stopper 209 fixed to the bracket 206, for preventing rotation of the supporter 205 at a certain angle or more.

The sensing unit 220 includes: a first contact switch 221 installed at a position adjacent to the first link member 203 of the supporter 205 and coming in contact with the first link member 203 pivoted by a displacement in a vertical direction of the wheel 202; and a second contact switch installed at a position adjacent to the second link member 204 of the supporter 205 and coming in contact with the second link member 204 pivoted by a displacement in a vertical direction of the wheel 202.

The elastic member 230 is connected to a lower portion of the supporter 205 on the basis of the rotation center of the supporter 205, namely, the center of the first pin 207a and provides an elastic force for rotating the lower portion of the supporter 205 toward a rear side of the cleaner body 1. Namely, a force for rotating the supporter 205 about the first pin 207a clockwise on FIG. 10 works on the supporter 205. Here, when the robot cleaner normally travels, the supporter 205 maintains its stopped state by the stopper 209.

By such a structure, when the cleaner body 1 meets the stepped portion such as a doorsill, the wheel 201 ascends by the stepped portion, and the connection rod 202 also ascends. Accordingly, the first and second link members 203 and 204 are respectively rotated about the first and third pins 207a and 207c connected to the supporter 205 counterclockwise on FIG. 10.

Accordingly, by the rotation of the first link member 203, a side surface of the first link member 203 comes in contact with the first contact switch 221, and the control unit 10 senses this contact and controls the driving motor 51, thereby allowing the robot cleaner to avoid the stepped portion like the doorsill.

In addition, when the cleaner body 1 meets the depressed portion, the wheel 201 descends by its own weight, and the connection rod 202 descends, too. Accordingly, the first and second link members 203 and 204 are respectively rotated about the first and third pins 207a and 207c connected to the supporter clockwise on FIG. 10.

Accordingly, by the rotation of the second link member 204, a side surface of the second link member 204 comes in contact with the second contact switch 222, and the control unit 10 senses this contact and controls the driving motor 51, thereby allowing the robot cleaner to avoid the depressed portion.

Meanwhile, when the robot cleaner moves backward to avoid the depressed portion or the stepped portion such as a doorsill, resistance is generated at the wheel 201 and the connection rod 202. By such resistance, the supporter 205 is rotated about the first pin 207a counterclockwise on FIG. 10. In case that the robot cleaner completely avoids the depressed portion or the stepped portion, the supporter 205 returns to its original state by an elastic force of the elastic member 230.

While the robot cleaner normally travels, the stopper 209 prevents the supporter from being rotated at the certain angle or more.

Accordingly, if the robot cleaner moves backward to come of the depressed portion or the stepped portion, the resistance generated at the wheel 201 and the connection rod 202 is decreased by the rotatably installed supporter 205 and the elastic member 209 which provides an elastic force to the supporter 205.

Undesired shaking of the wheel 201, the connection rod 202 and the first and second link members 203 and 204, which may be caused when the robot cleaner moves backward, is prevented by the rotatably installed supporter 205 and the elastic member 209 providing an elastic force to the supporter 205.

As so far described, the robot cleaner in accordance with the present invention is provided with a sensing unit having a mechanical structure. to correctly sense a depressed portion or a stepped portion such a doorsill of a floor during traveling, thereby stably carrying out the cleaning operation.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A robot cleaner comprising:

a cleaner body defining an inside and having a suction unit that performs a vacuum cleaning operation;

a driving unit that causes the cleaner body to travel along a surface;

a sensing unit operatively connected with the cleaner body to sense irregularities on the surface the cleaner body travels along; and a control unit that cooperates with the sensing unit and the driving unit to allow the cleaner body to cope with the irregularities on the surface, wherein the sensing unit comprises:

a link mechanism that allows a wheel installed at a bottom of the cleaner body to rise or fall with respect to the bottom of the cleaner body due to the irregularities sensed as the cleaner body travels; and at least one switch which is activated by a movement of the link mechanism, thereby causing the control unit to control the driving unit to allow the cleaner body to travel in a manner that avoids the irregularities, wherein the link mechanism comprises:

a connection rod connected to the wheel and extended toward the inside of the cleaner body;

a supporter installed at the cleaner body;

a first link member having one end hinge-connected to an upper end of the supporter and another end hinge-connected to an upper end of the connection rod; and a second link member having one end hinge-connected to the supporter at a predetermined distance from a position of the supporter where the first link member is connected and another end hinge-connected to the connection rod at a predetermined distance from a position of the connection rod where the first link member is connected.

2. The robot cleaner of claim 1, wherein the first link member and the second link member are installed to maintain a parallel relationship therebetween.

3. The robot cleaner of claim 1, wherein the sensing unit comprises:
  first and second contact switches fixed to the cleaner body and respectively coming in contact with the first and second link members pivoted by a displacement in a vertical direction of the wheel.

4. The robot cleaner of claim 3, wherein the first contact switch is installed above the first link member and comes in contact with the first link member pivoted when the wheel and the connection rod move upward, and the second contact switch is installed under the second link member and comes in contact with the second link member pivoted when the wheel and the connection rod move downward.

5. The robot cleaner of claim 1, wherein an elastic member for providing an elastic force to the first or second link member is installed between the first or second link member and the cleaner body.

6. The robot cleaner of claim 1, wherein the sensing unit is installed near a front side of the cleaner body.

7. The robot cleaner of claim 1, wherein the link mechanism comprises:
  a bracket on which the supporter is rotatably installed; and
  an elastic member installed between the supporter and the bracket, for providing an elastic force to the supporter.

8. The robot cleaner of claim 7, wherein a stopper is installed at the bracket, the stopper preventing rotation of the supporter at a predetermined angle or more.

9. The robot cleaner of claim 7, wherein the elastic member is connected to a lower portion of the rotation center of the supporter.

10. The robot cleaner of claim 7, wherein the sensing unit comprises:
  first and second contact switches installed adjacent to the first and second link members and respectively coming in contact with the first and the second link members pivoted by a displacement in a vertical direction of the wheel.

11. The robot cleaner of claim 10, wherein the first and second contact switches are installed at the supporter.

12. The robot cleaner of claim 10, wherein the first contact switch is installed above the first link member and comes in contact with the first link member pivoted when the wheel and the connection rod move upward, and the second contact switch is installed under the second link member and comes in contact with the second link member pivoted when the wheel and the connection rod move downward.

13. A robot cleaner comprising:
  a cleaner body defining an inside and having a suction unit that performs a vacuum cleaning operation;
  a driving unit that causes the cleaner body to travel along a surface;
  a sensing unit operatively connected with the cleaner body to sense irregularities on the surface that the cleaner body travels along; and
  a control unit cooperating with the sensing unit and the driving unit to allow the cleaner body to travel in a manner that copes with the sensed irregularities on the surface,
  wherein the sensing unit comprises:
  a wheel installed at a bottom of the cleaner body that physically contacts the surface that the cleaner body travels along, a mechanism supporting said wheel; and
  at least one switch which is activated by a movement of the mechanism, thereby causing the control unit to control the driving unit to allow the cleaner body to avoids the irregularities,
  wherein the mechanism comprises:
  a connection rod connected to the wheel and extended toward the inside of the cleaner body;
  a supporter installed at the cleaner body;
  a first link member having one end hinge-connected to an upper end of the supporter and another end hinge-connected to an upper end of the connection rod; and
  a second link member having one end hinge-connected to the supporter at a predetermined distance from a position of the supporter where the first link member is connected and another end hinge-connected to the connection rod at a predetermined distance from a position of the connection rod where the first link member is connected.

14. The robot cleaner of claim 13, wherein the mechanism is a link mechanism that allows the wheel to rise or fall with respect to the bottom of the cleaner body due to the irregularities sensed as the cleaner body travels.

* * * * *